Nov. 22, 1966  H. H. BUNDSCHUH  3,286,661
RAISED DOUGHNUT MAKING MACHINE

Filed Oct. 24, 1963  2 Sheets-Sheet 1

INVENTOR.
HARRY H. BUNDSCHUH
BY
*Knox & Knox*

INVENTOR.
HARRY H. BUNDSCHUH
BY Knox & Knox

United States Patent Office 3,286,661
Patented Nov. 22, 1966

3,286,661
RAISED DOUGHNUT MAKING MACHINE
Harry H. Bundschuh, 2404 Denver Ave., San Diego, Calif.
Filed Oct. 24, 1963, Ser. No. 318,739
9 Claims. (Cl. 107—14)

The present invention relates generally to improvements in doughnut making machines and more particularly to an extrusion device which measures and forms doughnuts of yeast-raised doughs and is an improvement on the machine disclosed and claimed in my prior Patent No. 2,905,110 issued September 22, 1959.

The primary object of this invention is to provide means to vent dough-entrapped gas from the dough compression chamber of a doughnut machine or the like, prior to extrusion of the dough therefrom.

A further, more specific object is to provide an improved piston for a doughnut making machine of the kind described which will prevent trapping of gas in the extruded doughnuts.

A further object of this invention is to provide in such a machine an improved seal between the piston and cylinder walls which will permit the escape of gas but keep the loss of dough to a minimum.

A still further object is to provide an improved piston construction which will assist in directing the gas products in the dough to the clearance space between the cylinder and piston.

Finally, it is an object to provide a device of the aforementioned character which is simple, safe and convenient to use and which will give generally efficient and durable service.

With these objects definitely in view, along with other objects which will appear hereinafter as this description proceeds, this invention consists in the novel construction, combination and arrangement of elements and portions, as will be hereinafter fully described in the specification, particularly pointed out in the claims, and illustrated in the drawings which form a material part of this disclosure, and in which:

Figure 1:
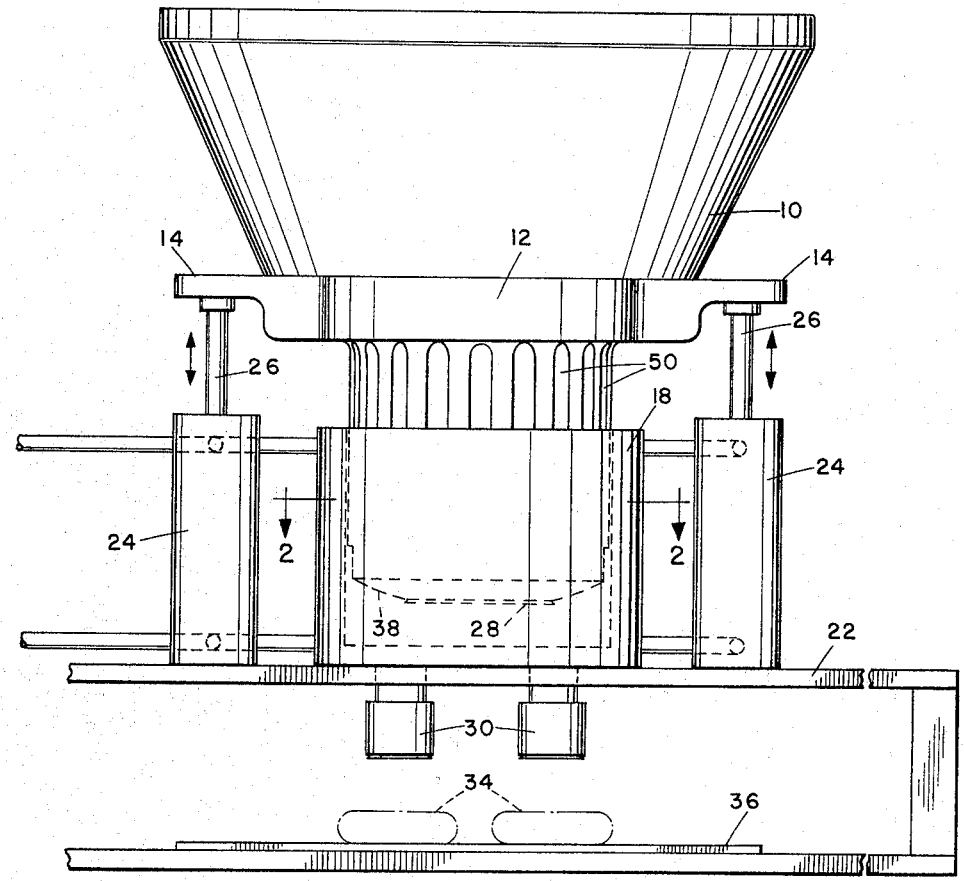
FIGURE 1 is a side elevation view of the hopper, cylinder, piston and conveyor tray of the improved doughnut making machine.
Figure 2:
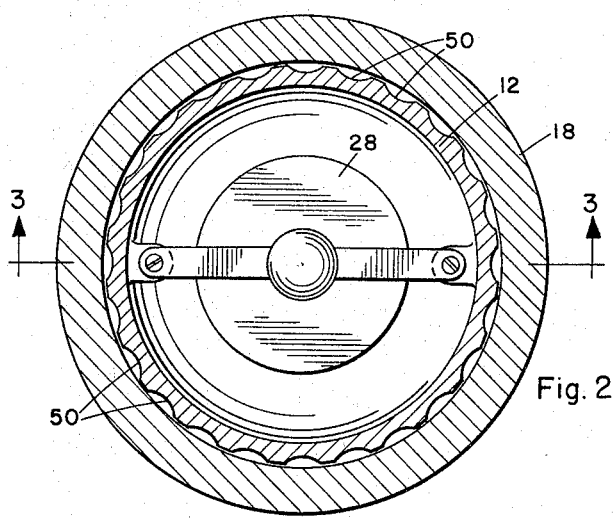
FIGURE 2 is a section, on an enlarged scale, on the line 2—2 of FIGURE 1.
Figure 3:
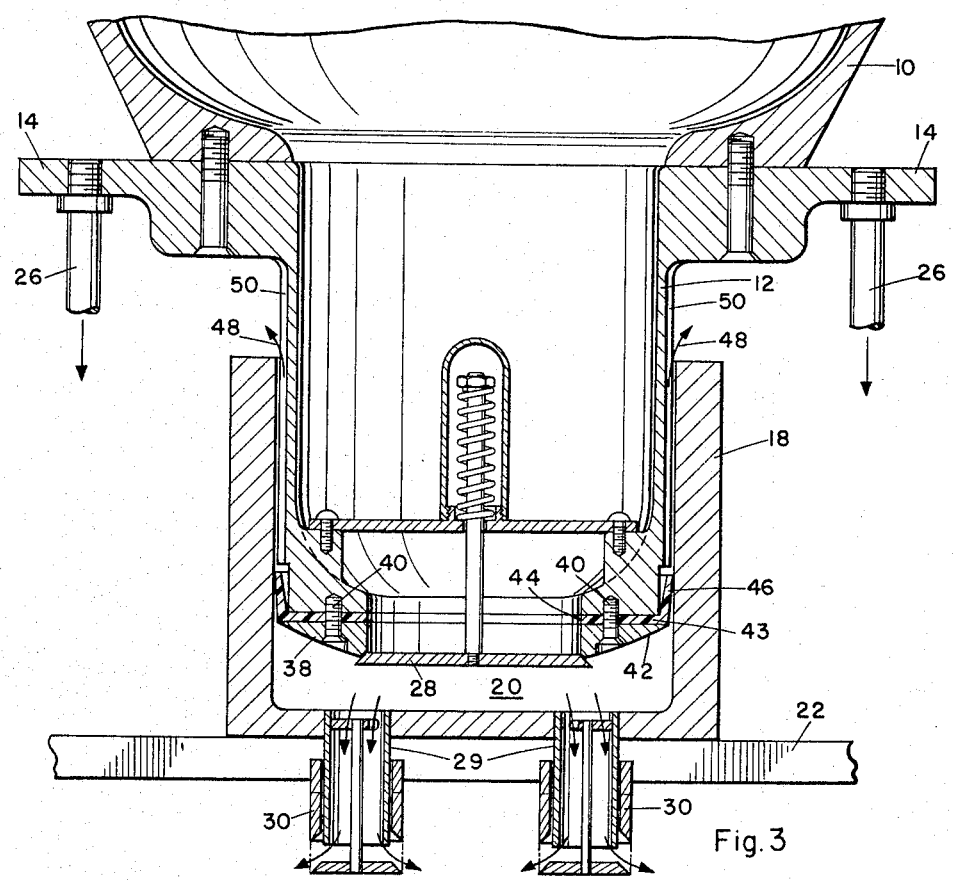
FIGURE 3 is a section on the line 3—3 of FIGURE 2.
Figure 4:
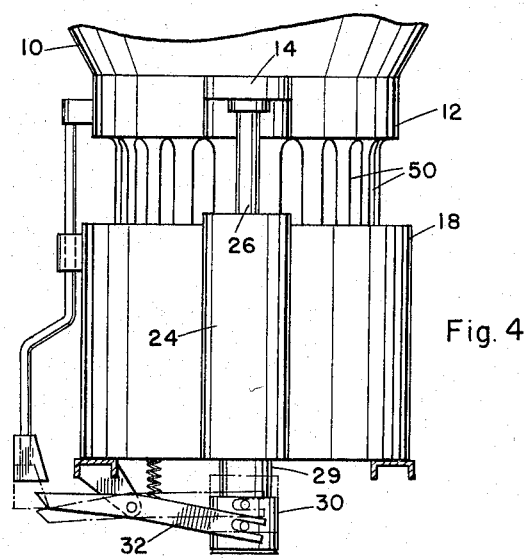
FIGURE 4 is a side elevation view showing the operation of the trip mechanism.

Referring now to the drawings in detail the dough hopper 10 is of any suitable cross sectional shape, preferably tapering downwardly as shown in FIGURE 1. The lower end of the hopper 10 has secured thereto, by any suitable means, a hollow piston 12 provided with oppositely extending ears 14. Piston 12 is reciprocably mounted in a cylinder 18. This cylinder, along with the closed end of the piston 12, defines the dough compression chamber 20. Cylinder 18 is supported on base frame 22. Also attached to base frame 22 are two hydraulic reciprocators 24, actuated in any well known manner, the piston rods 26 of which are connected to ears 14 to reciprocate piston 12 and with it hopper 10. A spring loaded valve 28 mounted centrally of the end of piston 12 controls the flow of dough from the hopper 10 and piston 12 into the dough compression chamber 20. Discharge tubes 29 are fitted with cut off sleeves or templates 30 and are controlled by trip mechanism 32. Downward movement of piston 12 forces dough through discharge tube and cut off templates 30 where it is discharged in the form of a raw doughnut 34 falling onto tray 36. This tray may be moved manually or automatically as desired.

The above structure is similar to that described in my prior patent noted above and to which reference is hereby made.

Doughnuts formed by the apparatus of the above noted patent are not entirely satisfactory. It has been found that air bubbles will be trapped in the batch of dough and fed into the dough compression chamber from which they are carried through the discharge tubes and cut off templates 30. During the cooking process the bubbles of air expand and form blisters on the surface which may rupture leaving gorges in the side of the finished product. The doughnuts produced are somewhat irregular in shape, materially affecting the sale value.

I have found that the above noted objection may be overcome by providing means associated with the piston and cylinder for bleeding air out of the dough as it is compressed in the dough compression chamber. The said means may vary somewhat but I have found that modification of the piston and piston seal structure alone can achieve the desired results. To this end I have provided the end of the piston with a separate ring member 38 secured thereto by fastening means 40. The exposed surface 42 of the ring is generally spherical or dome shaped. This is essential for, on the compression stroke of the piston, any gas bubbles in the dough will be squeezed radially outwardly toward the cylinder walls from which they can bleed upwardly as hereinafter described.

Secured between the ring 38 and the end of the piston 12 is a one way valve means 43 consisting of a centrally apertured disc 44 having an upstanding skirt flange 46 in contact with the wall of cylinder 18. This valve means is formed of resilient or deformable material such as synthetic rubber so that it will normally expand into engagement with the walls of cylinder 18. On the downward or compression stroke of the piston 12 pressure is built up in chamber 20. As previously stated, gas bubbles in the dough will be forced radially outwardly towards the cylinder walls due to the special shape of the ring 38. As the pressure increases valve means 43 will open by movement of flange 46 toward the piston walls leaving a gap between the piston and cylinder through which air can escape as shown by arrows 48. A small amount of dough may be carried up with the escaping air and will accumulate on the top edge of the cylinder and may be easily removed by a simple wiping action. If desired the piston may be provided with flutes 50 to facilitate the discharge of air.

From the above description it will be evident that I have provided a novel doughnut making machine which will facilitate the release of entrapped air from the dough and produce doughnuts of generally uniform quality.

It is understood that minor variation from the form of the invention disclosed herein may be made without departure from the spirit and scope of the invention, and that the specification and drawings are to be considered as merely illustrative rather than limiting.

I claim:
1. A dough extrusion machine comprising:
   a cylinder having an open end and a closed end with dough discharge outlets therein;
   a hollow piston having an open end and a closed end reciprocably mounted in said cylinder and forming with said cylinder a dough compression chamber;
   a one-way valve positioned centrally in said closed piston end so as to permit flow of dough from the interior of said piston into said compression chamber when said piston is moved in one direction; and vent means effecting the escape of gas entrapped in said dough compression chamber to the exterior of said chamber and including a one-way valve which is opened by the pressure exerted on the dough in said chamber to open as said piston is forced into said cylinder.

2. A dough extrusion machine as claimed in claim 1 in which said means further includes flutes on said piston extending beyond the open end of said cylinder.

3. A dough extrusion machine as claimed in claim 2 in which the closed end of the piston is generally of inverted dome shape.

4. In a dough extrusion machine having a fixedly-mounted cylinder with an open end and a closed end having dough discharge outlets therein,
   a hollow piston having an open end and a closed end and forming with said cylinder a dough compression chamber and a non-return valve positioned centrally in said closed piston end so as to permit flow of dough therethrough, the improvement which comprises:
   a one way valve means between said piston and cylinder which is opened by the pressure exerted therein during compression of dough in said chamber for passage of gas thereby expelled from the dough whereby gas entrapped in said dough compression chamber will escape between said cylinder wall and said piston wall.

5. The structure of claim 4 further including a fluted portion on the wall of said piston.

6. The structure of claim 4 in which said one way valve is a flexible ring member secured to said piston and having an axially extending skirt slidably engaging said cylinder.

7. The structure of claim 6 in which the closed end of the piston is generally dome-shaped.

8. The structure of claim 1 wherein said means also includes a ring member secured to the closed end of the piston, said ring member having a valve seat for the first mentioned valve and having an outer diameter corresponding substantially with the diameter of the piston, said ring member being tapered in thickness toward its outer circumference and providing, with said first mentioned valve, a generally dome-shaped form to said closed end, to force entrapped air bubbles, in dough in said compression chamber, toward the walls of said cylinder, and a centrally apertured disc of deformable resilient material secured between said ring member and the piston, said disc having an upstanding skirt flange contacting the wall of the cylinder.

9. The structure of claim 8 wherein said means further includes a fluted wall on said piston and
   said second valve is supported by and between said ring member and said closed end of the piston, said second one-way valve venting bubbles from dough in said compressor chamber to said fluted wall on the piston.

References Cited by the Examiner

UNITED STATES PATENTS

| | | | |
|---|---|---|---|
| 1,826,586 | 10/1931 | Williams | 25—15 X |
| 2,749,590 | 6/1956 | Kilpatrick | 18—12 X |
| 2,905,110 | 9/1959 | Bundschuh | 107—14 |

WALTER A. SCHEEL, *Primary Examiner.*

J. SHEA, *Assistant Examiner.*